F. M. COSSITT.
CAMERA.
APPLICATION FILED AUG. 19, 1914.
1,363,090.
Patented Dec. 21, 1920.
2 SHEETS—SHEET 2.
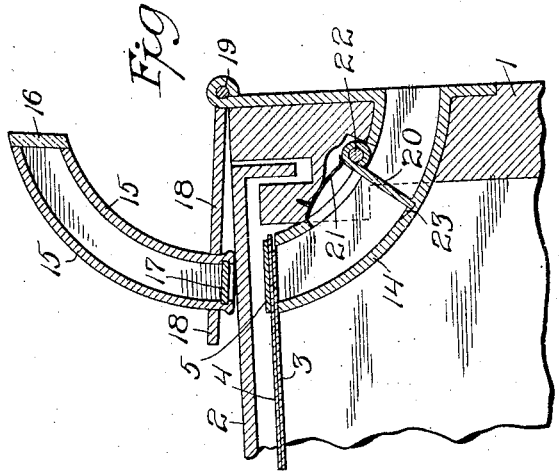
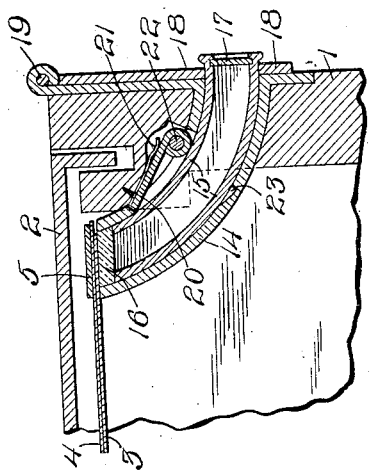
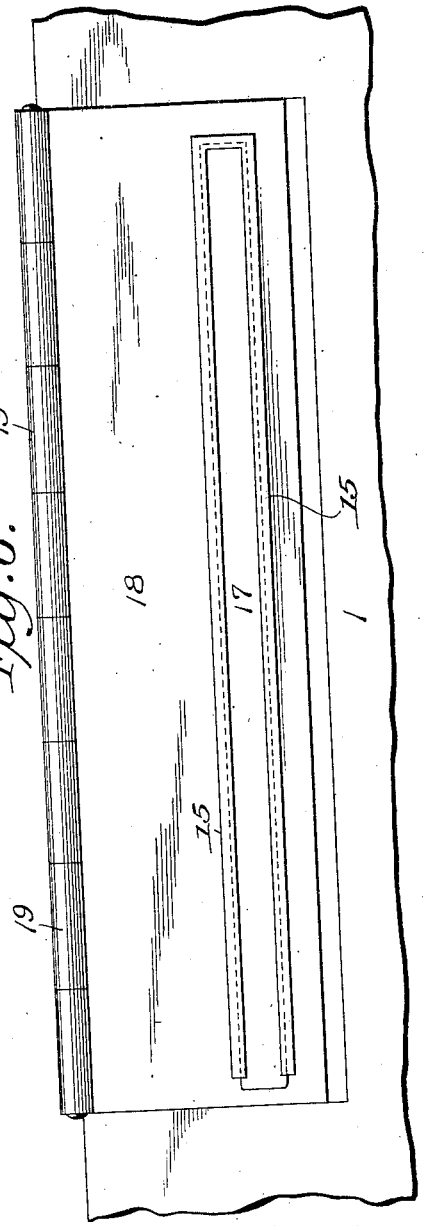
Witnesses:
A. R. Appleman
U. A. Hawkins
Inventor
Franklin M. Cossitt
By his Attorney
Phillips Abbott

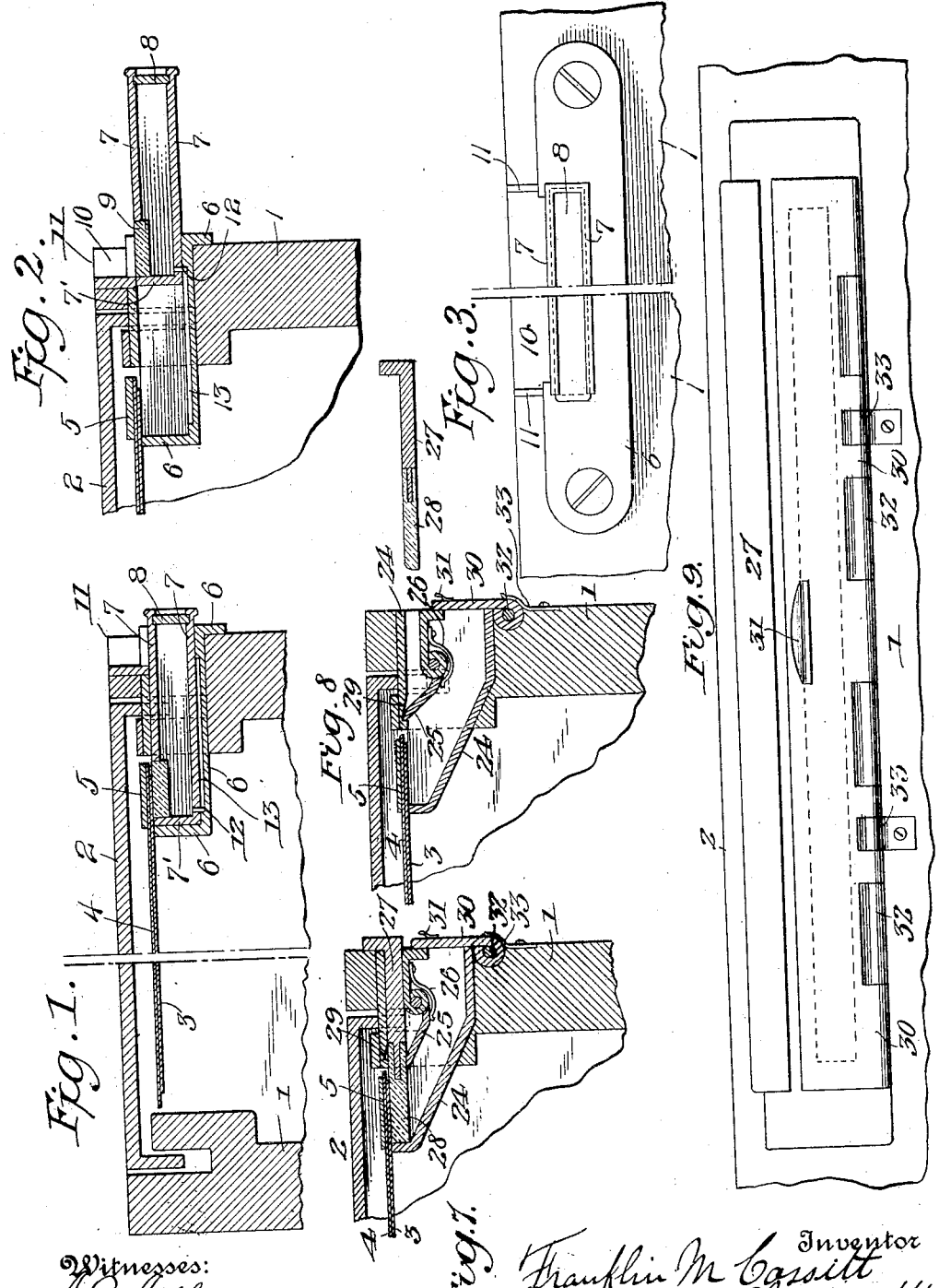

UNITED STATES PATENT OFFICE.

FRANKLIN M. COSSITT, OF BINGHAMTON, NEW YORK, ASSIGNOR TO ANSCO COMPANY, OF BINGHAMTON, NEW YORK, A CORPORATION OF NEW YORK.

CAMERA.

1,363,090.  Specification of Letters Patent.  Patented Dec. 21, 1920.

Application filed August 19, 1914.  Serial No. 857,438.

*To all whom it may concern:*

Be it known that I, FRANKLIN M. COSSITT, a citizen of the United States, and a resident of the city of Binghamton, county of Broome, and State of New York, have invented certain new and useful Improvements in Cameras, of which the following is a specification, reference being had to the accompanying drawings.

It is the purpose of this invention to provide a camera with devices whereby the photographer may conveniently and quickly produce upon the successive exposures of the sensitive film, such record or data as may be applicable thereto.

In the drawings hereof I show the invention as applied to a folding film-roll camera and I also show only such parts of the apparatus as are necessary for a clear understanding of the construction and method of operation of the invention. It will be understood that suitable obvious changes being made, the invention is applicable to practically all forms of camera. Furthermore the relative size of the parts and the construction of the camera illustrated in the drawings form no essential part of the invention.

In the drawings Figure 1 is a longitudinal sectional view, broken away, of a camera taken through the center of the devices forming the subject matter of this application, which are in their operative position; Fig. 2 is a view similar to Fig. 1, showing the parts constituting the invention in their projected position ready for the application thereto of the matter which is to constitute the record or data; Fig. 3 is an elevation, broken away, of one side of a camera showing an endwise view of the devices constituting this invention; Figs. 4, 5 and 6 are views corresponding to Figs. 1, 2 and 3 and showing a modified construction of the invention; Figs. 7, 8 and 9 are views corresponding to Figs. 1, 2 and 3 and showing still another modified construction of the invention.

Referring first to Figs. 1, 2 and 3, 1, 1, represent the two side pieces of the camera, 2 the camera back, shown in this case as removable, 3 the sensitive film, 4 the black paper backing therefor, 5 one of the springs which are usually supported by the removable back and which press the edges of the film and black paper into the focal plane, one only of these springs being shown here. 6 is a light-tight hollow casing built into the side of the camera 1 and projecting somewhat into its interior, so that its inner part shall properly register with the margin of the film. Within this case is a hollow sliding frame 7 at the outer end whereof is a light-excluding slide 8 and in its upper and inner part is a ground glass, translucent or transparent celluloid or equivalent surface or tablet 9, upon which writing in pencil or ink may be made. 10 (see Fig. 3) is a recess cut in the edge of the camera, bounded at each end by abutments 11, 11, to afford a vacant space for the convenient writing upon the ground glass or similar tablet 9. 12 is a pin, or equivalent stop, set in the bottom of the frame 7, which works through a groove, or its equivalent 13, made in the bottom of the fixed casing 6.

The operation of the parts thus far described is as follows:

If the photographer does not care to make any record of the exposure, then he leaves all the parts in the position shown in Fig. 1 and proceeds in the usual way.

If, however, he does desire a record, he takes hold of the laterally projecting end of the hollow frame or slide 7 and pulls it out into the position shown in Fig. 2. It will be noted that in so doing the stop 12 will limit the outward movement of the slide 7 at the time when the ground glass 9, or its equivalent, has become sufficiently exposed upon the outside of the camera, constituting, as it were, a bottom for the recess 10 and that the end 7' of the slide will preclude the entrance of light to the edge of the film. The operator now writes upon the exposed surface of the ground glass 9 such data as he desires shall appear upon the negative and thereupon presses the hollow slide 7 backwardly again into the camera until its primary position is attained as shown in Fig. 1. Thereupon the slide 8 of the hollow frame 7 is withdrawn, permitting the light to enter through it for such time, ordinarily from two to say five seconds, as may be necessary to effect, according to well known processes, the transference from the ground glass or similar surface or tablet, of the writing or record made thereon to the edge or marginal part of the photographic film. The slide 8 is then returned to primary position.

In Figs. 4, 5 and 6 I show a modified construction in which like reference numerals indicate like parts. In these figures 14 represents the exterior fixed casing similar to the casing 6 of Figs. 1, 2 and 3, made, however, on the arc of a circle and within it a similarly shaped hollow frame 15 swings, in effect substantially the same as the sliding movement of the frame 7 in Figs. 1, 2 and 3.

In this construction 16 is the ground glass or equivalent tablet and 17 is a slide similar to the slide 8 in Figs. 1, 2 and 3. This segmental hollow frame 15 is rigidly fastened to a swinging plate 18 which is hinged or pivoted at 19 to the corner of the camera. 20 is an automatically acting shutter controlled by a spring 21 and pivoted at 22.

The operation of this modified form is as follows:

The operator desiring to make his record takes hold of the projecting end of the segmental hollow frame 15 and pulls it outwardly, whereupon it and the swinging bar or plate 18 upon which it is supported, swing outwardly and upwardly upon the hinge 19, until it assumes the position shown in Fig. 5, whereupon the operator writes upon the exposed surface of the ground glass 16 such data as he desires shall be recorded. During the outward movement of the segmental frame 15, as soon as its inner end moves beyond the free edge of the automatic shutter 20, it, under the action of the spring 21, will follow the outwardly moving hollow frame until its free edge finally rests within the recess 23 in the fixed casing, effectively cutting off the entrance of light.

After the matter to be recorded has been produced upon the exposed surface of the ground glass tablet 16, the device is then swung backwardly again entering the fixed casing and into the position shown in Fig. 4, during which operation the automatic shutter 20 is shoved out of the way. The slide 17 is now drawn, light is admitted and the impression made upon the margin of the film, the same as before.

Figs. 7, 8 and 9 show still another modification. In them like reference numerals indicate like parts the same as before. In this construction 24 represents a fixed light-excluding casing similar to the casing 6 of Fig. 1 and 14 of Fig. 4. 25 is the automatically acting shutter resembling the shutter 20 of Fig. 4, which is actuated by a spring 26 similar to the spring 21 of Fig. 4, but in this case the slide 27 which carries the ground glass or equivalent surface or tablet 28 is not hollow and is made entirely removable from the camera, which may be a convenience to the operator in writing the data upon the plate 28. As seen in Figs. 7 and 8, the slide 27 is composed of a metal or wooden outer part with a rectangular portion or flange and the inner part 28 composed of ground glass or similar tablet. These parts are, in the example shown, connected to each other by a tongue and groove joint. The front edge of the ground glass plate or tablet is preferably rounded off as shown in Figs. 7 and 8, so as not to catch against, on the contrary to smoothly slide beneath the edges of the film and black paper when the slide is re-introduced into the camera.

The operation is as follows:

Upon withdrawing the slide from the camera for the purpose of writing thereon the matter to form the record, the automatic shutter 25 under the action of the spring 26 follows the receding slide and closes light-tight within the recess 29, shown in the upper member of the fixed casing 24. The slide being removed, wholly if desired, from the camera, the matter which is to form the record is written thereon, during which time the light is excluded by the automatic shutter. Upon re-introducing the slide, its front end striking against the shutter 25, presses it out of the way, but by that time the light-transmitting glass 28 is entirely within the camera, so that the wooden or other back part of the slide 27 prevents the admission of light. After it has been thoroughly introduced, the opening of the door 30 by means of the thumb clip 31, or otherwise, as the case may be, will permit the entrance of light with the result before described. The door 30 is hinged to the camera as at 32 and is normally maintained in closed position by springs 33.

It will be obvious to those who are familiar with such matters that the three forms illustrated and described, in which the invention may be made, are examples only of many that can be employed and I therefore do not limit myself in any respect to the details of construction illustrated and described, nor is it essential that the apparatus be constructed in such manner as to produce the data upon one of the side edges of the negative.

I claim:

1. A camera having in addition to its usual coöperating parts, an opening and the following elements: a frame impervious to light adapted to slide into said opening, a translucent tablet supported by the portion of the frame within the camera, and adapted to receive an inscription and to be moved into printing relation with a part of the sensitized member, means wholly within the camera which, during the movements of the frame, automatically and alone prevent the entrance of light through said opening when the latter is not closed by the frame, and light controlling devices which independently control the admission of light to and through the translucent tablet.

2. A camera having in addition to its usual coöperating parts, an opening, and the following elements: a frame impervious to light adapted to slide into said opening, a translucent tablet supported on the inner end of the frame, adapted to receive an inscription and to be moved into printing relation with a part of the sensitized side of the sensitive element, means wholly within the camera which, during the movements of the frame, alone prevent the entrance of light through the opening when the latter is not closed by the frame, and light admitting devices which independently control the admission of light to and through the translucent tablet.

3. A camera having in addition to its usual coöperating parts, an opening, and the following elements: a frame impervious to light adapted to slide into said opening and to fill the same so as to prevent the passage of light through said opening during part of its movements, a translucent tablet supported on said frame adapted to receive an inscription and to be moved into printing relation with a part of the sensitive member, means wholly within the camera which automatically and alone prevent the entrance of light through the opening when the latter is not closed by the frame, and light admitting devices which independently control the admission of light to and through the translucent tablet.

4. A camera having in addition to its usual coöperating parts, an opening, and the following elements: an automatically acting closure for said opening, a frame impervious to light adapted to slide into said opening, the construction and arrangement of the automatic closure and of the frame being such that one supplements the other to prevent the passage of any light through said opening, a translucent tablet supported on the frame and adapted to receive an inscription and to be moved into printing relation with a part of the sensitive element when the frame is inserted in said opening, and light admitting means separate and distinct from the shutter of the camera and also from said automatic closure of the frame opening and which control the passage of light to and through the tablet for the printing of the inscription on the sensitive element.

5. A camera having an opening in its side communicating with the space in front of the focal plane, a frame impervious to light adapted to slide into said opening, a translucent inscription plate supported on said frame, automatic closing means controlled by the movements of the frame and coöperating with the frame to prevent the entrance of light through said opening during all the movements of the frame, and light-admitting means which control the passage of light to and through the tablet for the printing of the inscription on the sensitive element.

6. The combination of a photographic camera having two separate and distinct exposure chambers, one of which is provided with an opening through which an autographic translucent inscription-receiving tablet may be inserted into and removed from printing relation with the sensitized element, means attached to the tablet which prevent the admission of light through said opening during part of the movements of the tablet, other means wholly within the camera which prevent the entrance of light through said opening when it is not closed by the light excluding means attached to the tablet, and separate means for controlling the passage of light to and through said tablet when in such printing relation.

7. A camera having a light tight tubular structure entirely within its outer walls, the inner end of said tubular structure having an opening in front of and close to the focal plane of the camera, a frame adapted to slide into the tubular structure, a translucent inscription tablet supported by and movable with the frame and adapted to be moved into printing relation with the sensitized surface of the sensitive element in such focal plane, means to exclude light from the sensitive element when said frame is removed from said opening, and light-admitting means to control the passage of light to and through the tablet when in printing relation with the sensitive element.

8. A camera having a light tight tubular structure entirely within its outer walls, the inner end of said tubular structure having an opening in front of and close to the focal plane of the camera, a frame adapted to slide into the tubular structure, a translucent inscription tablet supported by and movable with the frame, and adapted to be moved into printing relation with the sensitized side of the sensitive element, means brought automatically into action to prevent the passage of light into the tubular structure upon removal of the frame, and other means controllable to admit light to and through the tablet when it is in printing relation with the sensitive element.

9. A camera having two light tight exposure chambers, both within the outer walls of the camera, one for the main exposure and the other for a record making exposure, means for holding the same sensitive element in position for exposure at both chambers, a translucent inscription tablet movable through the record making chamber into and out of printing relation with the sensitive element, and means, separate from and independent of the light controlling means for the main exposure chamber, for controlling the passage of light into said record making chamber.

In testimony whereof I have signed my name to this specification in the presence of two subscribing witnesses.

FRANKLIN M. COSSITT.

Witnesses:
 ERNEST W. SCHULTZ,
 L. D. FIELD.